Patented July 1, 1924.

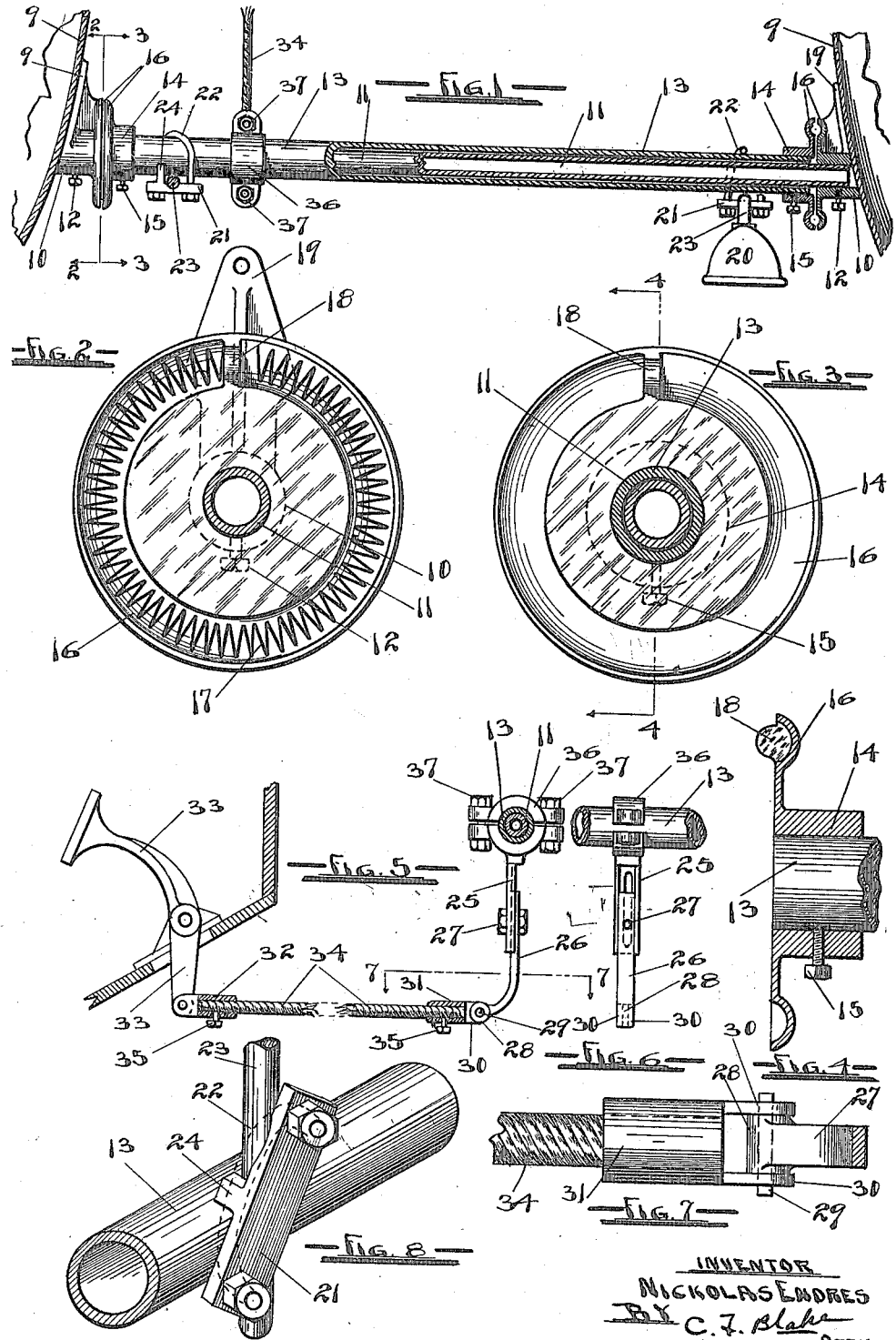

1,499,450

UNITED STATES PATENT OFFICE.

NICKOLAS ENDRES, OF SCIO, OREGON.

LAMP SUPPORT.

Application filed May 5, 1923. Serial No. 636,943.

*To all whom it may concern:*

Be it known that I, NICKOLAS ENDRES, a citizen of the United States, residing at Scio, county of Linn, State of Oregon, have invented certain new and useful Improvements in Lamp Supports, of which the following is a specification.

My invention relates to lamp supports in general, and particularly to such supports for automobile and vehicle lamps, the object being to provide means whereby said lamps may be moved through an arc to direct the rays of light therefrom either parallel with the road or downward upon the road, as desired; a further object is to make my device act as a fender brace for the automobile.

I accomplish the above objects by means of the construction illustrated in the accompanying drawing, which is a part of this application for Letters Patent, like characters of reference indicating like parts throughout the several views thereof, and in which:

Fig. 1 is a plan view of my device, parts being broken away to illustrate the construction.

Fig. 2 is a section upon line 2—2 of Fig. 1, drawn to an enlarged scale.

Fig. 3 is a section upon line 3—3 of Fig. 1, drawn to an enlarged scale.

Fig. 4 is a section upon line 4—4 of Fig. 3.

Fig. 5 is an end view showing the operating mechanism in detail.

Fig. 6 is an end view of the subject matter of Fig. 5.

Fig. 7 is a section upon line 7—7 of Fig. 5, drawn to an enlarged scale.

Fig. 8 is a perspective view of the lamp post fastening.

In general my device consists of a pair of concentric members one rotating upon the other; means upon the extremities of the inner of said members to secure said member to the front fender aprons of the automobile, said means being adjustable to the various angles of such aprons as found upon different automobiles; yielding coacting means upon said members to retain them in relative position, and to return them to said relative position after the outer member has been rotated; means to mount lamps upon said rotatable member; and means to operate said rotatable member from the driver's seat.

Upon the fender aprons of the automobile, shown at 9 in Fig. 1, I bolt a flanged hub 10, and I mount within said hubs a member, conveniently a pipe 11, said member being secured against rotation by set screws 12. Upon the member 11, and extending the full length thereof between the flanged hubs 10, I rotatably mount a member 13, and upon the extremities of said member I secure hubs 14 by means of set screws 15. The hubs 10 and 14 are each provided with adjacent annularly grooved flanges 16, said grooves coacting to house a spring 17 therein. Each of said grooves is provided with a lug 18, which lugs are held in contact one with the other by the spring 17. By this construction the member 13 may be rotated upon the member 11, the lugs 18 receding one from the other and thus compressing the spring 17. When the member 13 is released after having been rotated, the spring 17 will return said member to its initial position relatively to member 11.

In mounting the mechanism above described upon any automobile it is evident that the angle of the fender aprons 9 may be accommodated by rotating the mechanism as a whole until the flanges 19 of the hubs 10 lie flat upon the aprons 9. It is also evident that such rotation of the mechanism as a whole does not effect the operation of the member 13, and since the member 11 is secured within the hubs 10, which are in turn secured to the fender aprons 9, said member 11 constitutes a fender brace.

Lamps 20 are mounted upon the member 13 in any desired position longitudinally thereof, and so as to throw their light parallel to the road when the mechanism is in initial position, that is when the lugs 18 are in contact one with the other. To mount said lamps upon said member 13 I provide clips 21 and U bolts 22 to bolt the lamp rod 23 to the member 13, as shown in detail in Fig. 8. The U bolt prevents the relative angular movement of the lamp post 23 and the member 13 in one direction, and a lug 24 upon the clip 21 which lug contacts with the member 13 prevents such movement in the opposite direction.

To operate the member 13 I secure thereupon an extensible lever composed of two parts, a slotted part 25 and a part 26, these parts being secured by a suitable bolt 27. The part 26 terminates in an eye 28 which is pivotally connected by a pin 29 to embracing prongs 30 of a cable socket 31. A similar socket 32 is pivotally connected to a foot lever 33 conveniently located to the driver's seat, and said cable sockets are connected by a cable 34 mounted within said sockets, and secured therein by set screws 35. The lever 25 is secured upon the member 13 by a cap 36 and bolts 37.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. On an automobile: a pair of concentric members, one rotating upon the other; means upon the extremities of the inner of said members to secure the same to the fender aprons of the automobile, said means being adjustable to the various angles of said aprons; yieldable coacting means upon said members to retain them in relative position, and to return them to said relative position after the outer of said members has been rotated; means to mount lamps upon said rotatable member; and means to operate said rotatable member from the driver's seat.

2. On an automobile: fender aprons; flanged hubs secured to said aprons; annular grooved flanges upon said hubs; a member secured within said hubs; a member rotatably mounted upon said former member; annularly grooved flanges secured upon said latter member adjacent said former annular grooved flanges, and forming therewith a housing; a spring within said housing determining the initial relation of said grooved flanges; coacting stops within said grooved flanges; lamps secured upon said rotatable member; and means for rotating said latter member.

In witness whereof I claim the foregoing as my own, I hereunto affix my signature in the presence of two witnesses at Scio, county of Linn, State of Oregon, this 27th day of March, 1923.

NICKOLAS ENDRES.

Witnesses:
R. SHELTON,
F. N. JUNGWORTH.